United States Patent
Shimada et al.

[11] 3,910,737
[45] Oct. 7, 1975

[54] APPARATUS FOR AUTOMATICALLY MOLDING TABLETS INCLUDING SIZE AND WEIGHT CORRECTION

[76] Inventors: Yasuo Shimada, 104, Minamikamiai-cho, Nishinokyo, Nakakyo-ku, Kyoto; Giichiro Kowada, 3, Inoke-cho, Hanazono, Ukyo-ku, Kyoto, both of Japan

[22] Filed: Apr. 15, 1974

[21] Appl. No.: 460,986

[30] Foreign Application Priority Data
Nov. 30, 1973 Japan.............................. 48-135948

[52] U.S. Cl. ................ 425/140; 425/141; 425/354; 264/40
[51] Int. Cl.² ........................................ B30B 11/08
[58] Field of Search ...... 264/40, 109; 425/140, 141, 425/354; 177/60

[56] References Cited
UNITED STATES PATENTS

| | | |
|---|---|---|
| 2,338,491 | 1/1944 | Cutler.................................. 425/140 |
| 3,000,331 | 9/1961 | Frank................................... 425/140 |
| 3,063,390 | 11/1962 | Frank................................... 425/141 |
| 3,344,213 | 9/1967 | Vinson.................................. 264/109 |
| 3,724,569 | 4/1973 | Blodgett................................ 177/60 |

*Primary Examiner*—Robert F. White
*Assistant Examiner*—Willard E. Hoag
*Attorney, Agent, or Firm*—George B. Oujevolk

[57] ABSTRACT

Apparatus for manufacturing moulded goods automatically in a powder compression moulding machine wherein moulded goods are automatically extracted during operation of the powder compression moulding machine, their weight and thickness are automatically measured and when said measured values of weight and thickness exceed the preset respective limit values, a weight rail and a compressing lower roll are lifted and lowered, thereby adjusting automatically weight and thickness of moulded goods.

1 Claim, 1 Drawing Figure

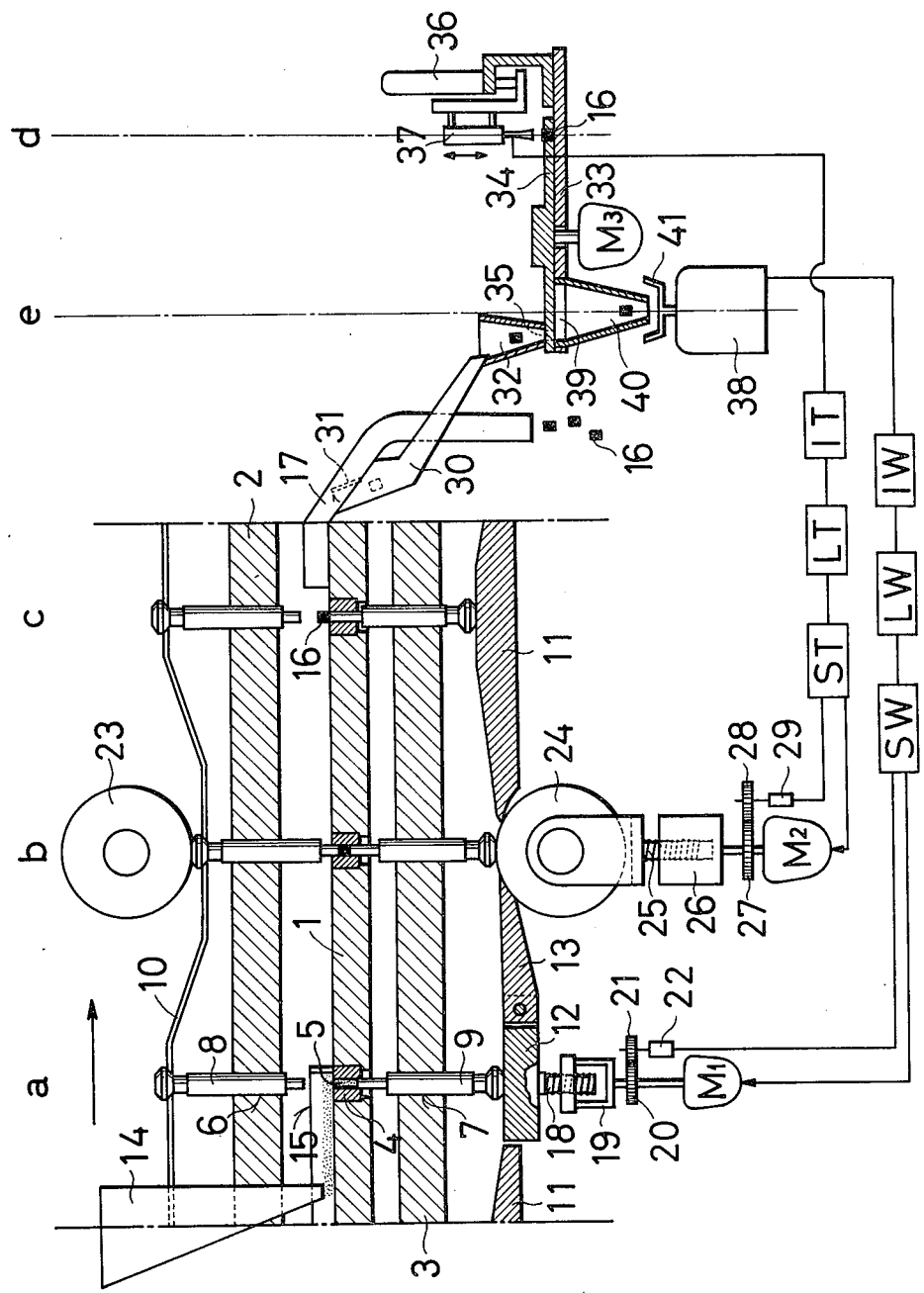

APPARATUS FOR AUTOMATICALLY MOLDING TABLETS INCLUDING SIZE AND WEIGHT CORRECTION

BACKGROUND OF THE INVENTION

The present invention relates to apparatus for manufacturing moulded goods automatically in a powder compression moulding machine, more particularly to a method of manufacturing moulded goods automatically in a powder compression moulding machine wherein weight and thickness of moulded goods are automatically adjusted.

Generally, weight and thickness of moulded goods vary for various causes, so that, in order to obtain moulded goods having weight and thickness which conform with the standard values, the operator has hitherto extracted the moulded goods frequently and measured their weight and thickness, and should they fail to meet with the standard values, he has hitherto had to lift or lower the weight rail and the compressing lower roll for adjustment of weight and thickness respectively in order to obtain moulded goods that conform with the standard values.

In this case, there is a great drawback that it takes a considerably long time to measure weight and thickness of moulded goods and adjust them, so that the greater part of the moulded goods which are moulded during this interval are wasted. Furthermore, there is a fatal drawback that, since the operator inevitably has to touch the powder compression moulding machine in order to measure and adjust moulded goods he cannot adjust weight and thickness of moulded goods in a sterilized room where he cannot enter.

OBJECT OF THE INVENTION

The object of this invention is to overcome these drawbacks of the conventional method of adjusting weight and thickness of moulded goods. More specifically, an object of this invention is to provide a method of manufacturing molded goods automatically in a powder compression moulding machine which makes it possible to automatically adjust both weight and thickness of moulded goods.

Another object of this invention is to provide a method of manufacturing moulded goods automatically in a powder compression moulding machine which makes it possible to adjust both weight and thickness of moulded goods instantly and promote production efficiency.

Still another object of this invention is to provide a method of manufacturing moulded goods automatically in a powder compression moulding machine which makes it possible to adjust weight and thickness of moulded goods by remote control outside the sterilized room.

These and other objects and features of the present invention will be better understood upon consideration of the following detailed description and the accompanying drawings.

BRIEF DESCRIPTION OF THE DRAWING

The accompanying drawing shows an embodiment of a powder compression moulding machine incorporating this invention, showing systematically the method of adjusting weight and thickness of moulded goods.

In the drawing, in order to show the operating condition of the punches, the turntable, etc. are represented in logitudinal section along the circumference where the punches are disposed, the imaginary cylindrical surface along said circumference being developed in a plane.

DETAILED DESCRIPTION

Referring to the drawing, a turntable 1, an upper punch guide block 2 and a lower punch guide block 3 are formed in one piece, and rotate around a rotary shaft of the powder compression moulding machine.

Along a fixed circumference on the surface of the turntable 1, a number of stepped holes (in the drawing 3 holes are shown) are bored at equal space, and in these stepped holes are fitted bushes 4, inside which are formed moulding chambers, i.e., dies 5. The bottom of these dies 5 is formed by the upper end of the lower punch 9 described later on.

In said upper punch guide block 2 and lower punch guide block 3 are formed respectively holes 6 and 7 in the position corresponding to the position of the dies 5 of said upper turntable 1, and in the hole 6 an upper punch 8, and in the hole 7 a lower punch 9 are slidably fitted.

The upper punch 8 moves toward the right in the drawing with its head suspended by an upper punch guide rail 10 disposed above the upper punch guide block 2. On the other hand, the lower punch 9 moves toward the right in the drawing, sliding on the surface of a lower punch guide rail 11, a weight rail 12 and a guide rail 13 which is rotatably attached to the end of the weight rail 12 with a pin.

Above said turntable 1 are disposed a hopper 14 containing powder, a feed chute 15 to feed powder that falls from the hopper 14, little by little into the dies 5, and a chute 17 to take out moulded goods.

In the drawing $a$ is the position where weight is adjusted $b$ is the compression moulding position as well as the position where thickness of the moulded goods is adjusted, $c$ is the position where the moulded goods are taken out and $e$ is the position where weight of the moulded goods is measured.

At position $a$, at the lower end of the weight rail 12 is attached a screw bar 18, which is screwed into a rotary nut 19 which is attached to the upper end of the shaft of a prime mover $M_1$ for adjusting weight. On the shaft of said prime mover $M_1$ is mounted a gear 20, and on a gear 21 which meshes with said gear 20 is mounted a multirotation variable resistor 22.

Now, weight of the moulded goods is determined by the volume of the dies 5 at position $a$, and this volume of the dies 5 is determined by the depth of the dies 5, so that ultimate weight can be adjusted by lifting and lowering the weight rail 12 by the prime mover $M_1$ for adjusting weight.

At position $b$, above or below the upper punch 8 and the lower punch 9 are disposed respectively the compression upper roll 23 and the compression lower roll 24, and at the lower end of the compression lower roll 24 is attached the screw bar 25, which is screwed into a rotary nut 26 which is attached to the upper end of the shaft of a prime mover $M_2$ for adjusting thickness. On the shaft of said prime mover $M_2$ is mounted a gear 27, and on a gear 28 which meshes with this gear 27 is mounted a rotary variable resistor 29.

Thickness of the moulded goods is determined by the space between the upper punch 8 and the lower punch 9 at position $b$, so that this thickness can be adjusted by lifting and lowering the compression lower roll 24 by the prime mover $M_2$ for adjusting thickness.

At position $c$, the lower punch 9 which is pushed up by the lower punch guide rail 11 pushes up the moulded goods 16 on to the plane of the upper surface of the turntable 1, and the moulded goods 16 is taken out by the chute 17. To this chute 17 is attached a chute 30 for extracting moulded goods 16 necessary for measuring weight and thickness. The moulded goods 16 is taken into the chute 30 for extraction by opening an open-close valve 31 provided inside said chute 17, and then discharged therefrom The discharged moulded goods 16 enters a container 32, and drops on to the surface of a measuring disc 34 which rotates on the surface of a base 33, driven by a prime mover $M_3$ for driving the disc, and then falls into a hole 35 bored in this measuring disc 34 and stops at position d.

At position $d$, thickness of the moulded goods 16 in the hole 35 of said measuring disc 34 is measured by a differential transformer 37 which is mounted on a device 36 that moves up and down.

With said differential transformer 37 is connected, via an indicator IT that indicates measured thickness, an upper and lower limit setter LT, which gives a signal when the upper and the lower limit of thickness exceeds the set limit value of thickness. This upper and lower limit setter LT is connected with a standard setter ST in which the median, i.e. the standard value, of the limit values of thickness is set and which calculates the difference between the standard value and the measured value. Said standard setter ST is connected with the prime mover $M_2$ for adjusting thickness and a multi-rotation variable resistor 29 that interlocks therewith.

At position $e$, weight of the moulded goods 16 is measured with an electronic balance 38. This moulded goods 16 was in the hole 35 of the measuring disc 34 which was at rest at position $d$, and it falls through a hole 39 when said measuring disc 34 turns further and comes to the position of the hole 39 bored in the base 33, and is placed on a scale 41 of said balance 38 by a guide chute 40. With said balance 38 is connected, via an indicator IW that indicates measured weight, an upper and lower limit setter LW in which the upper and lower limit of weight is set, and which gives a signal when measured weight exceeds the limit value of weight. This upper and lower limit setter LW is connected with a standard setter SW in which the median of the limit values of weight, namely the standard value of weight is set, and which calculates the difference between the standard value and the measured value. Said standard setter SW is connected with the prime mover $M_1$ for adjusting weight and a multi-rotation variable resistor 22 that interlocks therewith.

When the turntable 1 rotates, the upper punch 8 and the lower punch 9 pass the positions $a, b, c$ given in the drawing in this order and repeat this motion. During this interval powder is fed into the dies 5 by the feed chute 15, and then compressed and moulded by the compression upper roll 23 and the compression lower roll 24, and the moulded goods 16 is taken out by the chute 17.

The moulded goods 16 is taken out automatically by the extracting chute 30 at a proper time, and its weight is measured automatically at position $e$. These measured values are indicated in mm by the indicator IT, and in mg by the indicator IW. Both of these values are converted into electric quantity and transmitted to the upper and lower limit setter LT and the upper and lower limit setter LW respectively.

In the upper and lower limit setter LT are set previously the limit values of thickness. Since these limit values of thickness are memorized as electric quantity, the upper and lower limit setter LT compares the memorized electric quantity with that for said measured value of thickness, and when said electric quantity for said measured value exceeds said upper limit, it signals to the standard setter ST. Then the standard setter ST calculates the difference between the electric quantity for the preset and memorized standard value and that for said measured value, and at the same time signals to the prime mover $M_2$ for adjusting thickness, and drives it.

When said prime mover $M_2$ operates, the electric quantity of the multi-rotation variable resistor 29 which interlocks therewith changes. Said prime mover $M_2$ operates until the changed electric quantity of said multi-rotation variable resistor 29 becomes equal to differential electric quantity calculated by said standard setter ST, and stops when the former electric quantity becomes equal to the latter. By this, said prime mover $M_2$ is adjusted, so that it does not operate more than it is necessary.

The operation of the prime mover $M_2$ for adjusting thickness lifts or lowers the compression lower roll 24, thereby adjusting thickness of moulded goods 16 instantaneously.

Weight of moulded goods is adjusted in the same way as thickness of moulded goods described above, so that I omit describing it.

When weight and thickness of moulded goods are adjusted as above described, the open-close valve 31 is closed, and the moulded goods thus adjusted is taken out by the chute 17.

While the principles of the present invention have been described above in connection with specific embodiment, the method of extracting the moulded goods automatically, that of measuring automatically weight and thickness of moulded goods and that of lifting and lowering the weight rail and the compressing lower roll, etc. are not limited to the method shown in the above embodiment, but methods other than those mentioned above are possible.

We claim:

1. A machine for moulding tablets from powder, comprising in combination:
    a. horizontal turntable (1) having at least one vertical die chamber (5) therein;
    b. a hopper (14) disposed over the outer periphery of said turntable (1) including feed chute means for feeding powder to said die chamber (5);
    c. upper and lower punch guide blocks (2, 3) with vertical upper and lower punches (8, 9) each including a punch head thereon disposed to reciprocate in said guide blocks and enter said die chamber (5) at a compressing moulding position;
    d. upper and lower compression rolls (23, 24) so disposed over and under said compressing moulding position as to engage said punch heads as they pass before said rolls, and press said punches into said die to compress powder therein;
    e. an exit chute disposed at the outer periphery of said turntable (1) to receive a moulded tablet;
    f. upper guide rail means disposed over said turntable engaging said upper punch head and guiding it from a position where the punch does not engage the die to a position where the punch does engage the die;

g. lower guide rail means disposed under said turntable engaging said lower punch head and guiding it from a first position where said lower punch goes through the die and ejects a moulded tablet to a second position within the die defining the amount of powder fed to the die and to a third position over said lower roll defining the amount of compression exerted by said lower roll, said lower guide rail means including an adjustable weight rail defining the vertical penetration of the punch in the die fixing the amount of powder fed to the die from said feed chute means;

h. horizontal moving means with an aperture (35) therein disposed under said exit chute to receive formed tablets thereon and move some tables thereon, other tablets passing through said apertures;

i. measuring means (37) disposed adjacent said longitudinal moving means for measuring the size of said formed tablets;

j. weighing means (38) disposed under said aperture to receive a formed tablet thereon and weigh the tablet;

k. first and second vertical adjustment means (19, 26) under both said weight rail and said lower roll to adjust the amount of penetration of said lower punch into said die when said die receives powder and when said tablet is formed; and, l. feedback means from said measuring means (37) and said weighing means (38) to said first and second adjustment means to adjust said adjustment means in accordance with predetermined tablet size and weight in response to the size and weight information provided by said measuring means and weighing means.

* * * * *